United States Patent
Suenaga et al.

(10) Patent No.: US 12,555,774 B2
(45) Date of Patent: Feb. 17, 2026

(54) METHOD OF MAKING NEGATIVE ELECTRODE MATERIAL

(71) Applicant: OSAKA Titanium technologies Co., Ltd., Hyogo (JP)

(72) Inventors: Hiroshi Suenaga, Osaka (JP); Yusuke Kashitani, Nishinomiya (JP)

(73) Assignee: OSAKA TITANIUM TECHNOLOGIES CO., LTD., Hyogo (JP)

( * ) Notice: Subject to any disclaimer, the term of this patent is extended or adjusted under 35 U.S.C. 154(b) by 0 days.

(21) Appl. No.: 18/507,394

(22) Filed: Nov. 13, 2023

(65) Prior Publication Data

US 2025/0158019 A1  May 15, 2025

(51) Int. Cl.

| | |
|---|---|
| *H01B 1/04* | (2006.01) |
| *C04B 35/20* | (2006.01) |
| *C04B 35/626* | (2006.01) |
| *C04B 35/628* | (2006.01) |
| *C04B 35/64* | (2006.01) |
| *C04B 35/653* | (2006.01) |

(Continued)

(52) U.S. Cl.
CPC ............. *H01M 4/364* (2013.01); *C04B 35/20* (2013.01); *C04B 35/6262* (2013.01); (Continued)

(58) Field of Classification Search
CPC ......... H01B 1/00; H01B 1/04; H01M 4/0476; H01M 4/0483; C04B 35/04; C04B 35/20; C04B 35/62645; C04B 35/62807
See application file for complete search history.

(56) References Cited

U.S. PATENT DOCUMENTS 10,427,943 B2 * 10/2019 Takeshita ............... H01M 4/485
11,031,592 B2 *  6/2021 Kashitani ............... C01B 33/113
(Continued)

FOREIGN PATENT DOCUMENTS

JP   2017-204374     11/2017
WO  2023096443 A1    6/2023

OTHER PUBLICATIONS

Tang et al "Synthesis and characterization of lithium silicate powders", Fusion Engineering and Design 84 (2009) 2124-2130.*
(Continued)

*Primary Examiner* — Mark Kopec
(74) *Attorney, Agent, or Firm* — Millen, White, Zelano & Branigan, P.C.; Christopher W. Brody

(57) ABSTRACT

A method of making negative electrode material having silicon and silicate includes the steps of providing raw materials for contact fusion, heating the raw materials to form materials with a contact-fusion state, mixing silicon and the materials after forming contact-fusion to form a composite material, and vaporizing the composite materials on the deposition zone after the mixing step. The heating step is performed at the temperatures between the lowest melting temperature of the materials with the contact-fusion state and 1400° C. The deposited composite materials can be optionally heat treated, pulverized, and/or coated with carbon. Also provided is a negative electrode material of silicon and silicate made from the steps described above. The negative electrode material of silicon and silicate can be an Li—Mg silicate having silicon powder dispersed therein, the Li—Mg silicate forming a uniform interface on surfaces of the silicon powder.

6 Claims, 4 Drawing Sheets

(51) Int. Cl.
 *H01M 4/36* (2006.01)
 *H01M 4/38* (2006.01)
 *H01M 4/48* (2010.01)
 *H01M 4/58* (2010.01)
 *H01M 4/62* (2006.01)
 *H01M 4/02* (2006.01)

(52) U.S. Cl.
 CPC .. C04B 35/62807 (2013.01); C04B 35/62839 (2013.01); C04B 35/64 (2013.01); C04B 35/653 (2013.01); H01B 1/04 (2013.01); H01M 4/366 (2013.01); H01M 4/386 (2013.01); H01M 4/483 (2013.01); H01M 4/5825 (2013.01); H01M 4/625 (2013.01); *C04B 2235/3203* (2013.01); *C04B 2235/3206* (2013.01); *C04B 2235/3418* (2013.01); *C04B 2235/3445* (2013.01); *C04B 2235/428* (2013.01); *C04B 2235/442* (2013.01); *H01M 2004/027* (2013.01)

(56) References Cited

U.S. PATENT DOCUMENTS

| | | | |
|---|---|---|---|
| 12,095,076 B2* | 9/2024 | Sato | H01M 4/587 |
| 2018/0090750 A1 | 3/2018 | Oh et al. | |
| 2021/0066716 A1 | 3/2021 | Uchiyama et al. | |
| 2023/0078415 A1* | 3/2023 | Saito | H01M 4/134 |
| | | | 429/231.95 |
| 2025/0062322 A1 | 2/2025 | Park et al. | |

OTHER PUBLICATIONS

Crus et al "Kinetic analysis of the thermal stability of lithium silicates(Li4SiO4 and Li2SiO3)", Journal of Solid State Chemistry 179 (2006) 909-916.*

Bikram Konar et al., "Coupled experimental phase diagram study and thermodynamic optimization of the $Li_2O$—$MgO$—$SiO_2$ system", Journal of the American Ceramic Society, Issue 4, vol. 101, Apr. 2018, pp. 1711-1726.

* cited by examiner

Li-Mg Silicate
(Contact-Fusion)

METHOD OF MAKING NEGATIVE ELECTRODE MATERIAL

FIELD OF INVENTION

The present invention relates generally to a method of making negative electrode material, and more particularly to a method of making negative electrode material containing a step of reacting contact-fusion.

THE BACKGROUND OF INVENTION

Silicon-based materials are used as high capacity negative electrode materials for lithium-ion batteries, but they have inferior battery lifetime characteristics. SiO is synthesized by the reaction of $SiO_2+Si$ under reduced pressure and has excellent battery lifetime characteristics, but its initial coulomb efficiency (initial discharge capacity divided by initial charge capacity) are low.

Li-doped SiO, a composite of Si and lithium silicate, improves initial efficiency, but due to the reactivity of lithium silicate, it has high pH, reacts with water, etc., and deteriorates during battery assembly.

Mg-doped SiO, Si and magnesium silicate composite has high stability and improves the initial coulomb efficiency, but the effect of battery performance improvement is limited because the Mg weight is heavy, which leads to a decrease in battery capacity, and increasing the Mg doping amount causes the crystallization of the Si phase to progress, resulting in a decrease in battery lifetime characteristics.

Although Li—Mg doped SiO has been researched to solve these problems, a new doping technology that is uniform and can withstand industrial production is required because two elements must be added to SiO, but this method has not been established. In particular, it is extremely difficult to stably create a material with a uniform distribution of $Li_2O$, MgO, and $SiO_2$.

As a result of the inventor's diligent research, they discovered a new phenomenon, so called "contact-fusion" which is extremely easy to stably create a material with a uniform distribution of $Li_2O$, MgO, and $SiO_2$. Based upon this discovery, inventors have reached this invention.

BRIEF SUMMARY OF THE INVENTION

It is to be appreciated that the use of any of the following "at least one of", for example, in the cases of "at least one of A and B", is intended to encompass the selection of the first listed option (A) only, or the selection of the second listed option (B) only, or the selection of both options (A and B). As a further example, in the cases of "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

In various exemplary embodiments, a method of making negative electrode material comprising silicon and silicate, includes the steps of providing raw materials for contact-fusion, heating the raw materials to form contact fusion state, mixing silicon and materials after forming contact fusion, and vaporizing composite materials after the mixing step. The heating step is performed at the temperatures between 650° C. and 1400° C.

In another exemplary embodiment, a method of making negative electrode material comprising silicon and silicate, includes the steps of providing raw materials for contact fusion, heating the raw materials to form contact fusion state, mixing silicon and materials after forming contact fusion, vaporizing composite materials after the mixing step, and at least one of steps of heat treating, pulverizing and carbon coating for the vaporized composite materials collected in a solid state. The heating step is performed at the temperatures between 650° C. and 1400° C.

In various exemplary embodiments, a method of making negative electrode material comprising silicon and silicate, includes the steps of providing raw materials for contact fusion, heating the raw materials to form materials with a contact-fusion state, mixing silicon and the materials after forming contact-fusion to form a composite material, and vaporizing the composite materials zone after the mixing step, wherein the heating step is performed at the temperatures between the lowest melting temperature of the materials with the contact-fusion state and 1400° C.

The raw materials used in the providing step can include $SiO_2$, $Li_2O$ and MgO, and can preferably include MgO—$SiO_2$ powder and $Li_2CO_3$ powder. The raw materials are intended to have a high melting point.

In another embodiment, the raw materials in the providing step include at least one of a $Li_2O$ precursor and an MgO precursor having a low melting point and at least one of $SiO_2$, $Li_2O$ and MgO having a high melting point.

In another exemplary embodiment, a method of making negative electrode material comprising silicon and silicate, includes the steps of providing raw materials for contact-fusion, heating the raw materials to form materials having a contact-fusion state, mixing silicon and the materials after forming contact-fusion to form composite materials, and vaporizing the composite materials after the mixing step, and further, at least one of the steps of heat treating the vaporized composite materials, pulverizing the vaporized composite materials, and coating the vaporized composite materials with carbon, wherein the heating step is performed at the temperatures between the lowest melting temperature of the materials with the contact-fusion state and 1400° C.

Another embodiment of the invention includes the negative electrode material comprising silicon and silicate that is produced by a process including providing raw materials for contact-fusion, heating the raw materials to form materials having a contact-fusion state, mixing silicon and the materials after forming contact-fusion to form composite materials, and vaporizing the composite materials after the mixing step, wherein the heating step is performed at the temperatures between the lowest melting temperature of the materials with the contact-fusion state and 1400° C.

The negative electrode material of silicon and silicate can be a Li—Mg silicate having silicon powder dispersed therein, the Li—Mg silicate forming a uniform interface on surfaces of the silicon powder.

Another embodiment of the invention includes a precursor material for the method of making the negative electrode material, the precursor material being the Li—Mg silicate having the contact fusion state. The Li—Mg silicate having a contact-fusion state can be $LiO_2$, MgO, and $SiO_2$, in a contact fusion state.

BRIEF DESCRIPTION OF THE DRAWINGS

The following description will provide details of preferred embodiments with reference to the following figures wherein.

DETAIL DESCRIPTION OF THE INVENTION

In various exemplary embodiments, method of making negative electrode material is provided.

The silicate in the negative electrode material contains Li and Mg, resulting in a negative electrode material with high capacity, high initial coulomb efficiency and water resistance, as well as high battery characteristics. To obtain this negative electrode material, the raw material, which is a mixture of Si powder and a silicate material containing Li and Mg and having a melting point below 1400° C., is heated under reduced pressure at a temperature below 1410° C. (Si melting point) and above the melting point of Li—Mg silicate. Thereby, the solid Si powder and uniformly molten Li—Mg silicate material form a uniform interface, and a uniform vaporization reaction proceeds under reduced pressure. At the interface between solid Si and molten Li—Mg silicate material, the following vaporization reaction proceeds under reduced pressure at temperatures below 1410° C. (x+y<1)

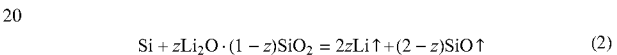

$$Si + xLi2O - yMgO - (1 - x - y)SiO_2 = 2xLi\uparrow + yMg\uparrow + (2 - x - y)SiO\uparrow \quad (1)$$

Figure 1:
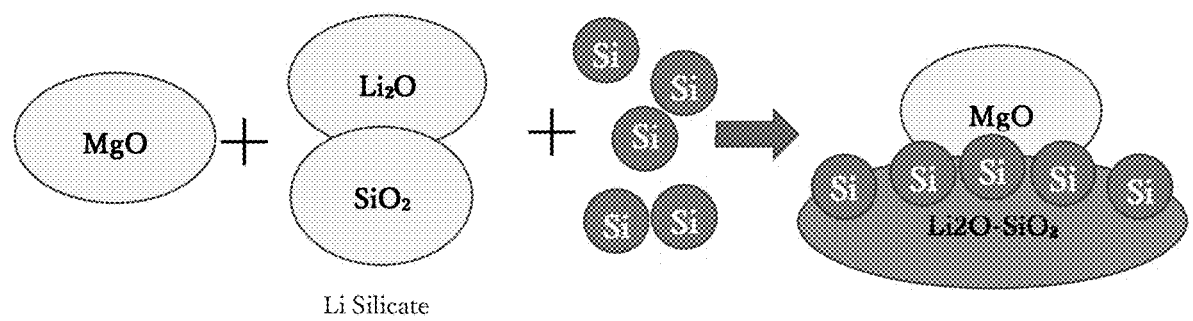
FIG. 1 depicts molten Li silicate and crystalline MgO having high surface tension, which are difficult to wet each other and most of the molten Li silicate will fall

If one tries to realize equation (1) stoichiometrically, an easy way is to use a mixture of crystalline $Li_2O$, MgO, $SiO_2$ and Si. However, the melting points of crystalline $Li_2O$, MgO, and $SiO_2$ are very high (1570° C., 2852° C., and 1650° C., respectively) and do not melt below the temperature of 1400° C. Therefore, simply mixing these materials with Si results in a solid phase reaction, and the reaction is difficult to proceed. It is possible to consider replacing equation (1) with Li silicate, which has a low melting point: the melting points of $Li_2Si_2O_5$, $Li_2SiO_3$, and $Li_4SiO_4$ are 1027° C., 1201° C., and 1255° C., respectively, and they completely melt at the temperature of 1400° C. If part of the completely molten Li silicate acts as a flux and melts the crystalline MgO component to form molten Li—Mg silicate, the reaction described in equation (1) will proceed, but since both molten Li silicate and crystalline MgO have high surface tension, they are difficult to wet each other and most of the molten Li silicate will fall (FIG. 1), or contact with Si first, resulting in the reaction described in equation (2). As a result, the reaction in equation (1) cannot be selectively targeted, and the physical properties of the reaction recovery are not stable and vary with each reaction.

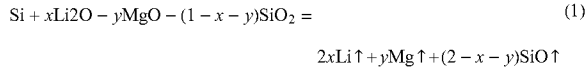

$$Si + zLi_2O \cdot (1 - z)SiO_2 = 2zLi\uparrow + (2 - z)SiO\uparrow \quad (2)$$

Figure 2:
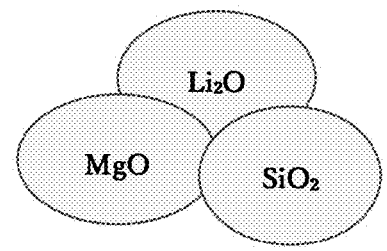
FIG. 2 depicts Li—Mg Silicate having the state of contact-fusion.

Therefore, the inventors conducted numerous experiments on Li—Mg silicate materials and discovered that, by chance, Li—Mg silicate materials in which a precursor containing Li—Mg was pre-heated reacted uniformly (the liquid and solid phases were not separated). The solid phase floated and drifted on the liquid phase (the liquid and solid phases were separated) in the high-temperature furnace in many experiments, but the liquid and solid phases were not separated in the high-temperature furnace under a certain limited condition. Here, the inventors call the state having effect of pre-heating the Li—Mg-containing precursor "contact-fusion" (FIG. 2). The contact-fusion state can be observed by SEM (Scanning Electron Microscope) in many cases. Depending on the raw material used, it is difficult to observe by SEM. In such cases, elemental mapping of the cross section can be performed by STEM (Scanning Transmission Electron Microscope) and EELS (Electron Energy-Loss Spectroscopy) to observe the fusion of Li—Mg.

Figure 3:
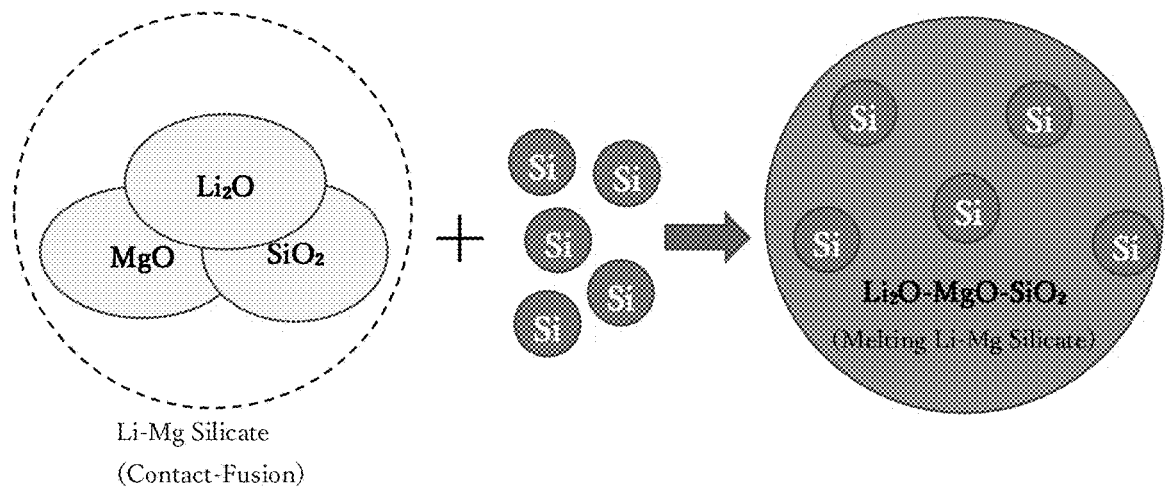
FIG. 3 depicts uniform interface with contact fused Li—Mg silicate on the Si surface.

After repeated experiments, the inventors found that when Si powder is mixed with contact fused Li—Mg silicate and reacted at a temperature of around 1300° C., melted Li—Mg silicate form a uniform interface on the Si surface (FIG. 3). The inventors speculate that the uniform interface can be formed on the Si surface because the contact-fusion point immediately fuses at the reaction temperature due to the flux action, wetting the Si surface and preventing separation of the liquid and solid phases.

Two conditions are necessary for performing contact-fusion.

Figure 4:
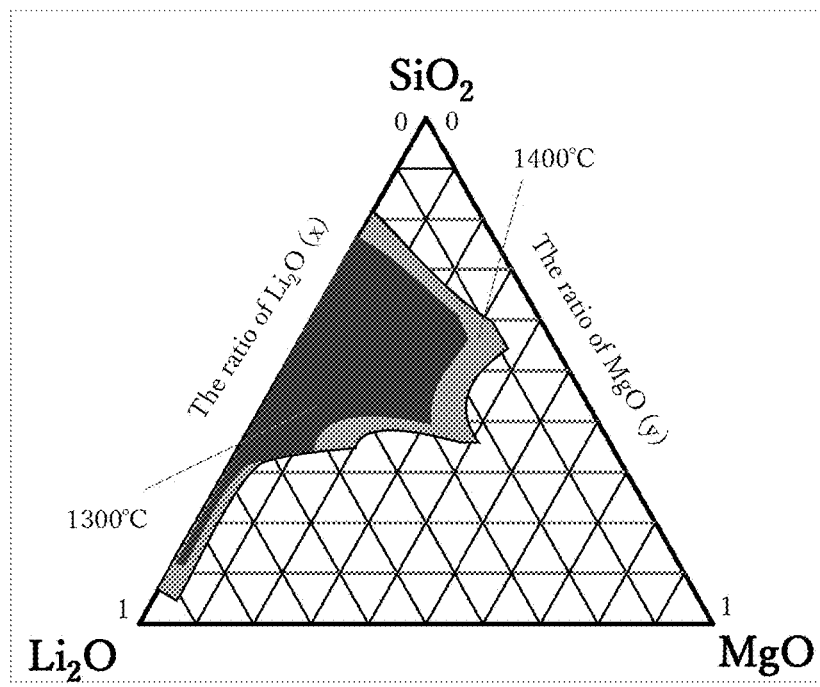
FIG. 4 is the $Li_2O$—MgO—$SiO_2$ phase diagram, in which a range of x and y below 1300° C. and below 1400° C. are shown.

The first condition is that the melting point must be below 1400° C. in order for the contact-fused silicate material to melt immediately, and the ratio of x and y in equation (1) must be adjusted to keep the melting point below 1400° C. The range of x and y is limited and is below 1400° C. in the $Li_2O$—MgO—$SiO_2$ phase diagram. (FIG. 4) On the other hand, the temperature inside the reactor is not always uniform due to its size. For example, there may be a temperature difference of several tens of degrees between the center and the edge of the reactor. Considering this, the ratio of x and y is preferable to be adjusted to the $Li_2O$—MgO—$SiO_2$ system phase diagram of 1300° C. or less to ensure uniform melting.

The second condition is that the temperature at which contact fusion of the precursor containing Li—Mg occurs should be 650° C. or higher. If the temperature is too low, contact fusion of the Li—Mg silicate phase will not proceed. The confirmation of the contact-fusion is conducted by observation using SEM.

The raw material of Li—Mg silicate may contain oxides other than Mg and Li, such as Na, K, and B. The addition of other elements can lower the melting point and promote more uniform liquid phase formation and vaporization reaction.

Next, the contact fused Li—Mg silicate material is mixed with Si powder. Mixture of Si powder and the silicate is vaporized under reduced pressure at a temperature below 1410° C. and above the melting point of Li—Mg silicate to obtain composite material. Contact-fused Li—Mg silicate material may be pulverized. Contact fusion is effective even when pulverized. The mixing ratio of Li—Mg silicate and Si in the raw material should be adjusted to satisfy 0.5<O/Si<2.0 of the total raw material. If the ratio O/Si is not more than 0.5, much unreacted Si remains, and if the ratio O/Si is not less than 2.0, much unreacted Li—Mg silicate remains. In either case, the yield rate is reduced. The vaporized composite material is collected in a solid state and becomes a negative electrode material. Regarding the Si content of the negative electrode material containing Si and silicate phase obtained by the above, the O/Si ratio of the entire negative electrode material should satisfy 0.5<O/Si<1.5. If the ratio O/Si is not more than 0.5, the lifetime characteristics will decrease, and if the ratio O/Si is not less than 1.5, the weight of the silicate phase will increase charge/discharge capacity and efficiency will decrease. This negative electrode material may be heat-treated at 500° C. or higher. Heat treatment improves oxidation resistance and facilitates handling in air. It may also be pulverized. Pulverization improves the lifetime characteristics when made into batteries. The negative electrode material may also have a carbon coating. The carbon coating improves water resistance and conductivity, improves handling when making into electrodes, and improves the characteristics when made into batteries.

EXAMPLES

The present invention is now explained with reference to the following Examples and Comparative Examples. However, these Examples and Comparative Examples are described for facilitating the understanding of the invention, and the present invention shall not be limited to these Examples and Comparative Examples.

Example 1

588.5 g of MgO SiO$_2$ ceramic powder with a MgO:SiO$_2$ molar ratio of 1:2 (a moisture content of about 4 mass %, and an average particle size of about 10 μm) were mixed with 261.1 g of Li$_2$CO$_3$, and filled into graphite sagger (849.6 g in total), and then heated at 900° C. for 4 hours under nitrogen atmosphere.

Figure 5:
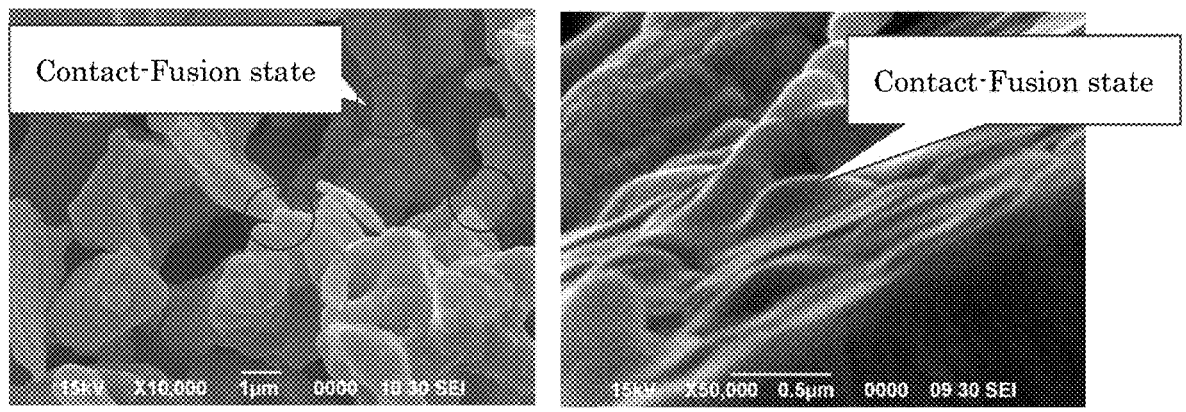
FIG. 5 is SEM observation of the heated Li2O—MgO—$SiO_2$ silicate, in which Li2O—MgO—$SiO_2$ (contact-fusion state) are shown.

After heating, the material weighed 672.9 g, which was less than the material before heating. Since the weight loss corresponds to CO$_2$+H$_2$O, the CO$_2$ and H$_2$O components in the heated raw material were removed, and the material composition after heating was only Li$_2$O—MgO—SiO$_2$ silicate. SEM (JEOL JSM-6390LA) observation of the heated Li$_2$O—MgO—SiO$_2$ silicate material showed that Li$_2$CO$_3$, which melted simultaneously during heating, fused with MgO SiO$_2$ ceramic powder and formed Li$_2$O—MgO—SiO$_2$ contacts, indicating a contact-fusion state (FIG. 5).

Figure 6:
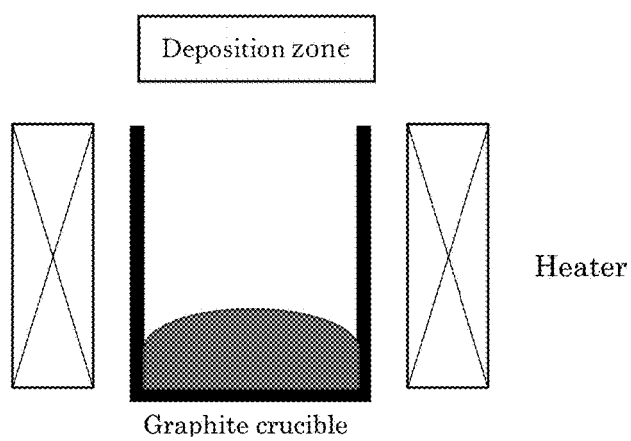
FIG. 6 depicts a vacuum furnace, in which deposition zone at the top is shown.

After heating, 672.9 g of Li$_2$O—MgO—SiO$_2$ silicate material was crushed to powder in a pot mill with alumina balls. 427.1 g of Si powder was added to the pot mill and mixed in the pot mill. The mixed silicate+Si mixed powder, 1000 g was put into a graphite crucible and introduced into a vacuum furnace with a deposition zone at the top. (FIG. 6) The furnace was evacuated with a vacuum aimed at 5 Pa, and heated to a temperature of about 1300° C. The vaporization reaction was carried out, and deposition was performed at the top of the crucible. The vacuum level fluctuated during the temperature increase, but stabilized at about 5 Pa after the reaction temperature was increased to about 1300° C. The residue in the crucible after the reaction was 18 g with a yield of 98.2%, and the deposited product had almost the same composition as the silicate+Si mixed powder which was put into the graphite crucible.

Figure 7:
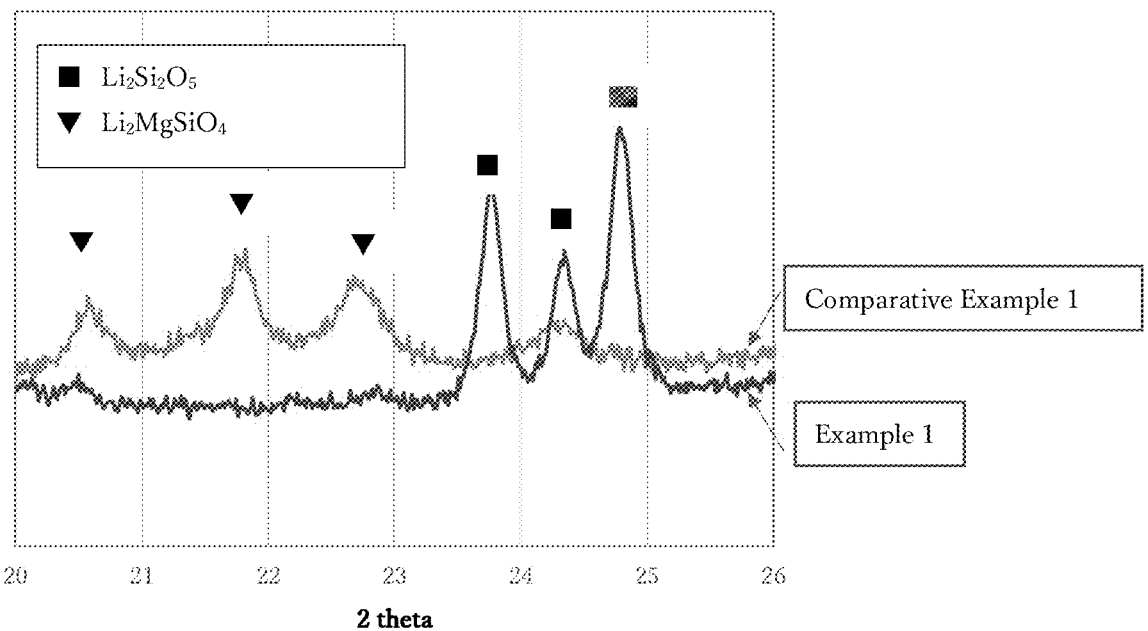
FIG. 7. is XRD (X-ray diffractometry) measurement after heat treatment, in which Example 1 and Comparative Example 1 are shown.

The deposited materials were collected without air exposure and heat-treated at 850° C. under an Ar atmosphere. XRD (X-ray diffractometry, Malvern Panalytical X'pert2) measurement after heat treatment is shown in FIG. 7. XRD measurement shows that no peaks were observed based on the presence or a concentration of Li$_2$MgSiO$_4$ at 2θ=20° to 23.5°. The peaks observed at 2θ=23.5° to 25.0° are Li$_2$Si$_2$O$_5$ peaks, which are a result of the raw material and processing described above to form the negative electrode material.

The deposited material after heat treatment was ground down to 10 μm using a vertical agitator with zirconia balls, and the particles were heated to 650° C. in a quartz tube. Conductive carbon coating was applied to the particles by flowing hydrocarbon gas and pyrolyzing them on the surface to produce the negative electrode material.

Example 2

612.1 g of MgO—SiO$_2$ ceramic powder with a MgO:SiO$_2$ molar ratio of 17:46 (a moisture content of about 3 mass %, and an average particle diameter of about 10 μm) was mixed with 216.5 g of Li$_2$CO$_3$, and filled into in graphite sagger (828.6 g in total), and then heated at 900° C. for 4 hours under nitrogen atmosphere for contact-fusion. After heating, 682.1 g of Li$_2$O—MgO—SiO$_2$ silicate material was crushed in a pot mill with alumina balls. 417.9 g of Si was added to the pot mill and mixed in the pot mill for the vaporization reaction material. The negative electrode material was made from the reaction material in same manner of Example 1. As a result, the Li—Mg silicate could be produced without Li$_2$MgSiO$_4$ peaks, similar to the results for Example 1.

Example 3

530.1 g of MgO—SiO$_2$ ceramic powder with a MgO:SiO$_2$ molar ratio of 3:10 (a moisture content of about 2 mass %, and an average particle diameter of about 10 μm) was mixed with 370.6 g of Li$_2$CO$_e$, and filled into in graphite sagger (900.7 g in total), and then heated at 900° C. for 4 hours under nitrogen atmosphere for contact-fusion. After heating, 667.1 g of Li$_2$O—MgO—SiO$_2$ silicate material was crushed in a pot mill with alumina balls. 432.9 g of Si was added to the pot mill and mixed in the pot mill for the vaporization reaction material. The negative electrode material was made from the reaction material in same manner of Example 1. As a result, the Li—Mg silicate could be produced without Li$_2$MgSiO$_4$ peaks, similar to the results for Example 1.

Comparative Example 1

530.5 g of Li$_2$Si$_2$O$_5$ powder (an average particle size of about 10 μm), 142.4 g of MgO powder (an average particle size of about 10 μm), and 427.1 g of Si powder were mixed for vaporization reaction materials. The reaction materials, 1000 g was put into a graphite crucible and introduced into a vacuum furnace. The furnace was evacuated with a vacuum aimed at 5 Pa, and heated to a temperature of 1300° C. for the vaporization reaction. The vacuum level fluctuated during the temperature increase, but stabilized at around 5 Pa after the temperature was maintained at around 1300° C. The material collected from the deposition at the top of the crucible was heat-treated at 850° C. in an Ar atmosphere. XRD measurement after heat treatment is shown in FIG. 7. Unlike Examples 1-3, the raw materials and processing used in Comparative Example 1 results in the presence or concentration of $Li_2MgSiO_4$ peaks, as shown in FIG. 7. The presence or concentration of $Li_2MgSiO_4$ in the negative electrode material of Comparative Example 1 significantly deteriorates the Li ion conductivity when the concentration exceeds a certain level, so that the lithium ion batteries using the above materials deteriorates the charge/discharge capacity and initial Coulomb efficiency.

Comparative Example 2

Figure 8:
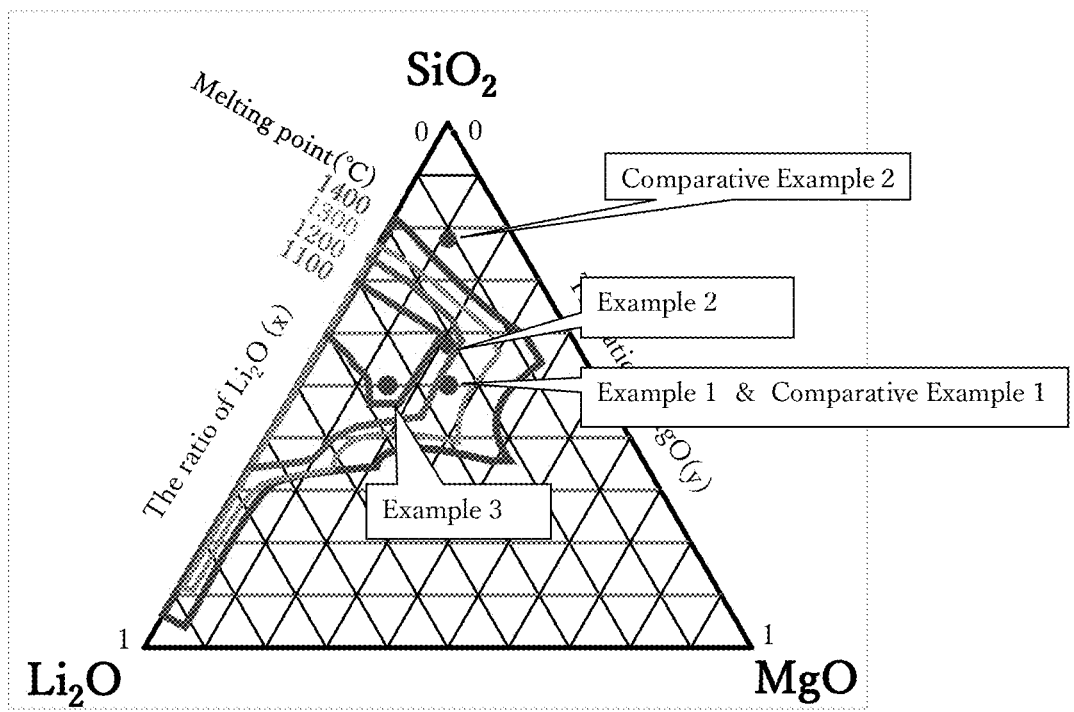
FIG. 8 is the Li2O—MgO—$SiO_2$ phase diagram, in which the points of Examples and Comparative Examples are shown.

663.9 g of $MgO$—$SiO_2$ ceramic powder with a $MgO:SiO_2$ molar ratio of 1:7 (a moisture content of less than about 1 mass %, and an average particle diameter of about 10 μm) was mixed with 50.3 g of $Li_2CO_3$, and filled into in graphite sagger (714.2 g in total), and then heated at 900° C. for 4 hours under nitrogen atmosphere for contact-fusion. After heating, 680.2 g of the silicate material was crushed in a pot mill with alumina balls. 419.8 g of Si was added to the pot mill and mixed in the pot mill for the vaporization reaction material. The negative electrode material was made from the reaction material in same manner of Example 1. As a result of the use of raw materials and processing similar to that of Example 1, the Li—Mg silicate could be produced without the presence or concentration of $Li_2MgSiO_4$ peaks. The concentration or presence of $Li_2MgSiO_4$ in the negative electrode material significantly deteriorates the Li ion conductivity when the concentration exceeds a certain level, so that the lithium ion batteries using the above materials deteriorates the charge/discharge capacity and initial Coulomb efficiency. While $Li_2MgSiO_4$ was not present in Comparative Example 2, the melting point for the material of Comparative Example 2, see FIG. 8, was too high to form a reaction interface, resulting in a significantly lower reaction yield of 83.5%. Furthermore, thick deposits were observed in the chimney of Graphite crucible, probably due to its high melting point, which prevented deposition in the deposition zone. This was found to be unsuitable for mass production.

The corresponding structures, materials, acts, and steps in the claims below are intended to include any structure, material, or act for performing the function in combination with other claimed elements as specifically claimed. The description of the present disclosure has been presented for purpose of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method of making negative electrode material comprising silicon and silicate, comprising the steps of:
   providing raw materials for contact-fusion;
   heating the raw materials to form materials with a contact-fusion state;
   mixing silicon and the materials after forming contact-fusion to form a composite material; and
   vaporizing the composite materials after the mixing step,
   wherein the heating step is performed at the temperatures between the lowest melting temperature of the materials with the contact-fusion state and 1400° C.

2. The method according to claim 1, wherein the raw materials in the providing step include $SiO_2$, $Li_2O$ and $MgO$.

3. The method according to claim 2, wherein the raw materials in the providing step include $MgO$—$SiO_2$ powder and $Li_2CO_3$ powder.

4. The method according to claim 2, wherein the raw materials have a melting point that is 1400° C. or higher.

5. The method according to claim 1, wherein the raw materials in the providing step include at least one of a $Li_2O$ precursor and an $MgO$ precursor having a melting point that is 900° C. or lower and at least one of $SiO_2$, $Li_2O$ and $MgO$ having a melting point that is 1400° C. or higher.

6. A method of making negative electrode material comprising silicon and silicate, comprising the steps of:
   providing raw materials for contact-fusion;
   heating the raw materials to form materials having a contact-fusion state;
   mixing silicon and the materials after forming contact-fusion to form composite materials;
   vaporizing the composite materials after the mixing step; and
   at least one of the steps of heat treating the vaporized composite materials, pulverizing the vaporized composite materials, and coating the vaporized composite materials with carbon, wherein the heating step is performed at the temperatures between the lowest melting temperature of the materials with the contact fusion state and 1400° C.

* * * * *